No. 681,288. Patented Aug. 27, 1901.
W. O. WORTH.
AUTOMATIC LUBRICATOR.
(Application filed May 28, 1900.)
(No Model.) 2 Sheets—Sheet 1.
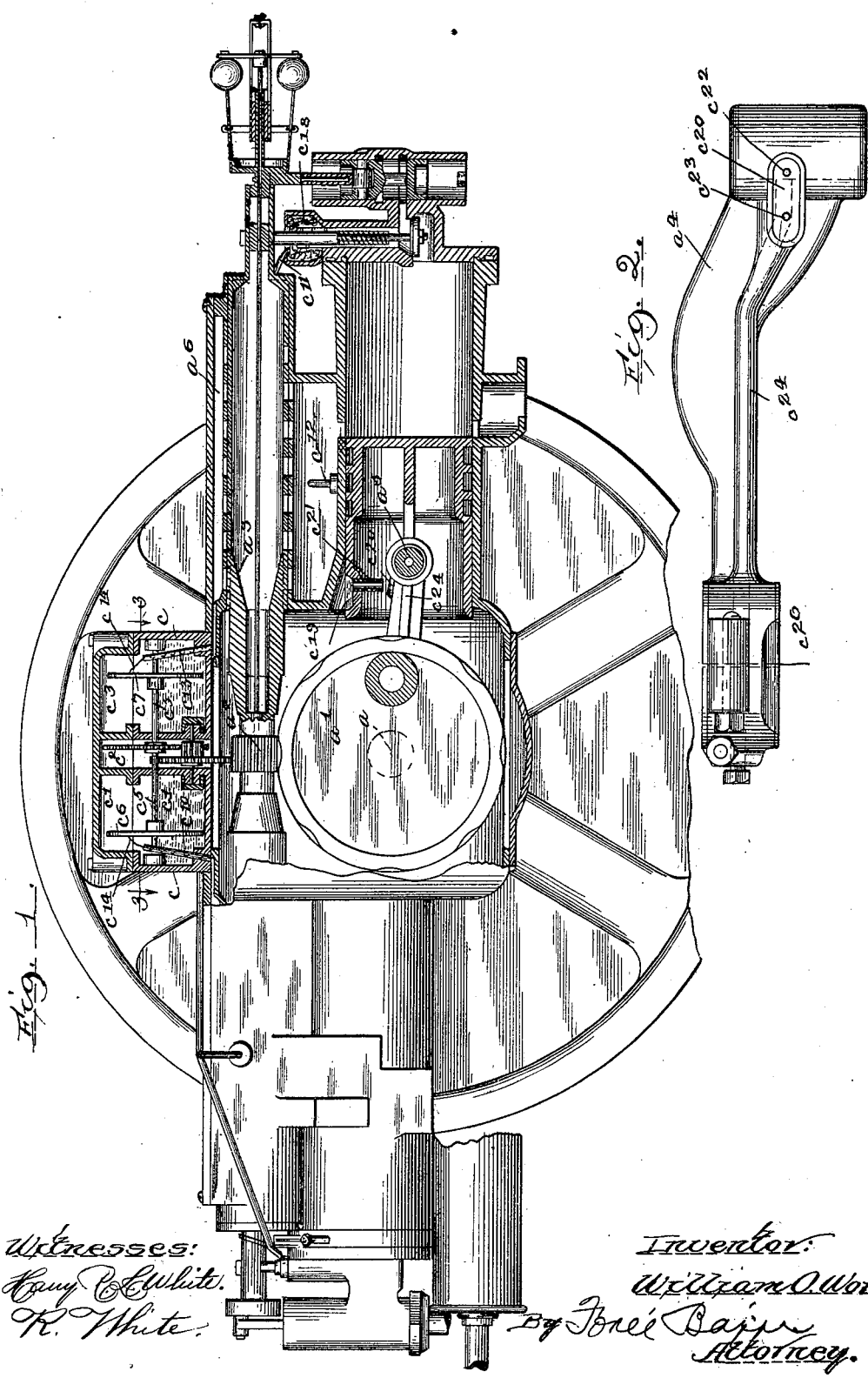

No. 681,288. Patented Aug. 27, 1901.
W. O. WORTH.
AUTOMATIC LUBRICATOR.
(Application filed May 28, 1900.)
(No Model.)
2 Sheets—Sheet 2.
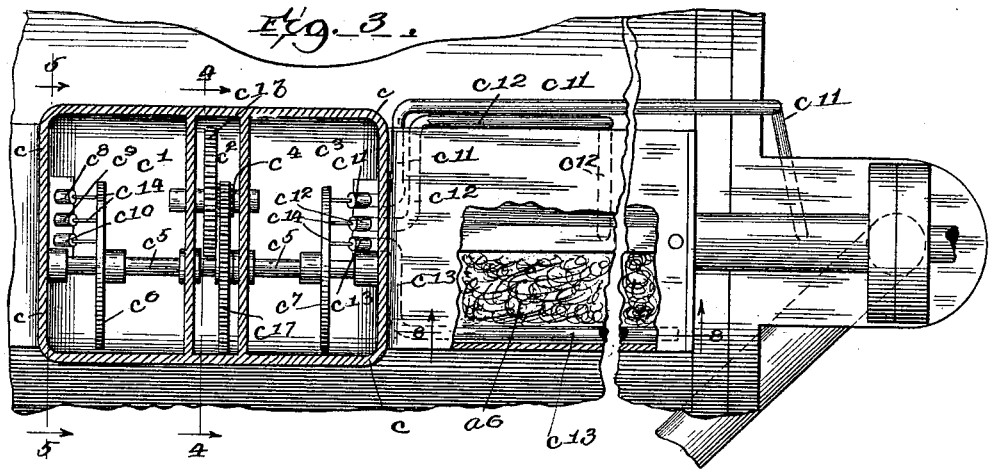
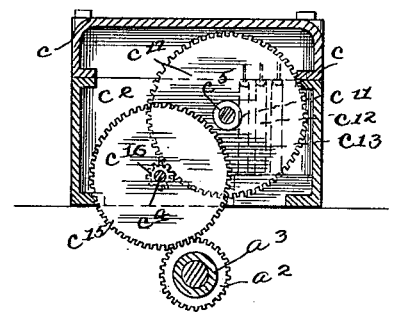
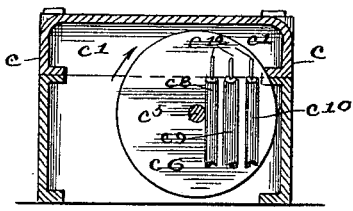
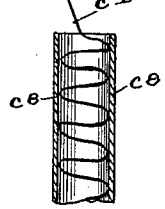
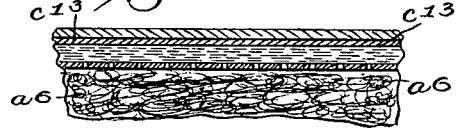
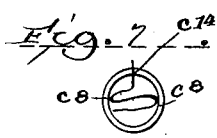
Witnesses:
Harry C. E. White.
R. White.
Inventor:
William O. Worth,
By Forré Bain
Attorney.

United States Patent Office.

WILLIAM O. WORTH, OF CHICAGO, ILLINOIS, ASSIGNOR OF TWO-THIRDS TO WILLIAM R. DONALDSON, OF SAME PLACE, AND HENRY W. KELLOGG, OF BATTLECREEK, MICHIGAN.

AUTOMATIC LUBRICATOR.

SPECIFICATION forming part of Letters Patent No. 681,288, dated August 27, 1901.

Original application filed June 19, 1899, Serial No. 721,078. Divided and this application filed May 28, 1900. Serial No. 18,267. (No model.)

*To all whom it may concern:*

Be it known that I, WILLIAM O. WORTH, a citizen of the United States, residing at Chicago, county of Cook, and State of Illinois, have invented certain new and useful Improvements in Automatic Lubricators; and I do hereby declare the following to be a full, clear, and exact description, such as will enable persons skilled in the art to which it appertains to make and use the same.

My present application is a division of my application, Serial No. 721,078, filed June 19, 1899.

My present invention relates to improvements in lubricating devices for engines, whereby the lubricating-oil will be supplied automatically to the various moving parts of an engine in constant streams, but variable as to quantity.

The effect of a lubricant when applied to the moving surfaces in contact for eliminating friction reaches its highest degree of efficiency in its lubricating qualities due to the viscosity of the lubricant and as to the quantity required for the purpose when the lubricant is supplied to the moving surfaces in a continual though it may be small quantity. The usual method adopted for supplying a lubricant consists in feeding the oil in drops and varying the time intervening between the said drops or by varying the size of the drops, the intervening time remaining practically constant.

In the drawings, Figure 1 is a side view of a gas-engine, partly in section, showing my lubricating device in section and as applied to an engine. Fig. 2 is a top view of a connecting-rod for connecting the piston to the crank of the engine. Fig. 3 is an enlarged view of my lubricating device in section taken on lines 3 3 of Fig. 1. Fig. 4 is an end section taken on lines 4 4 of Fig. 3. Fig. 5 is a similar view taken on lines 5 5 of Fig. 3. Fig. 6 is an enlarged sectional view of a tube for conveying the oil from the device to the point to be lubricated and the wire or brush for scraping the oil from the disk within the said tube. Fig. 7 is an end view of the same. Fig. 8 is a fragment of a section through lines 8 8 of Fig. 3.

The same reference-letters are used to indicate similar parts in all of the views.

Fig. 1 shows a side view of a double-cylinder gas-engine, partly in section, with my lubricating device mounted on top of the engine.

$a$ is the shaft of the engine.

$a'$ is a disk mounted on the shaft between the two main-shaft cranks of the engine. There are a series of spiral teeth cut into the face of the disk $a'$, that mesh into a pinion $a^2$, which in this case is mounted on the air-valve $a^3$, and which is the valve and means provided for revolving the air-valve and shaft.

A case $c$, containing my lubricating device, is mounted on the top of the engine-case. This case $c$ contains three compartments $c'$, $c^2$, and $c^3$. The walls of the middle compartment are partly perforated to provide bearings for shafts $c^4$ and $c^5$. Two flat smooth metal disks $c^6$ and $c^7$ are fixed to the shaft $c^5$. These disks extend nearly to the bottom of the case $c$ and into the oil that is contained in the compartments $c'$ and $c^3$. A series of tubes $c^8$ $c^9$ $c^{10}$ terminate near the disk $c^6$. A similar series of tubes $c^{11}$ $c^{12}$ $c^{13}$ confront the disk $c^7$. A spiral wire $c^{14}$ (shown enlarged in Figs. 6 and 7) is inserted in each of the tubes, with their ends bearing upon their respective disks, as shown. The wire is made spiral for the purpose of holding it more firmly within the tube and for the purpose of more securely conveying the oil into the interior of the tube. These tubes lead from their respective disks to the various points where the lubricant is required to be deposited. The shaft $c^5$ is driven by a series of gear-wheels and pinions $a^2$, $c^{15}$, $c^{16}$, and $c^{17}$.

The tube $c^{11}$ conveys the oil to a casing surrounding a valve-stem. I prefer to fill this casing with a suitable fibrous material $c^{18}$ to prevent the oil from being splashed out, as when the engine is used to propel a motor-vehicle.

Pipe $c^{12}$ supplies oil to the piston of the engine. A depression $c^{19}$ in the rear of the piston serves for a reservoir for catching a small quantity of oil at each reciprocation of the piston, from which it is conducted into a similar reservoir $c^{20}$ in the connecting-rod $a^4$ by means of the depending tube $c^{21}$. The reservoir $c^{20}$ contains two holes $c^{22}$ and $c^{23}$. The former communicates with the piston-pin $a^5$ and the latter, by means of the conduit $c^{24}$ in the body of the connecting-rod, with the bearing $c^{26}$ on the other end of the rod, and which surrounds the crank-pin of the engine.

Above the air-valve $a^3$ within the chamber $a^6$ the pipe $c^{13}$ is laid, Fig. 8. The bottom of this pipe is perforated at intervals for the purpose of distributing the lubricant at various points along the surfaces to be lubricated.

Pipes other than those shown may be used for conveying the lubricant to other or additional points, or one pipe may be used for conveying the lubricant to several points, as shown.

The train of gears connected with the lubricating device are designed to revolve the disks $c^6$ and $c^7$ about one revolution to ten revolutions of the shaft $a$ of the engine. The speed of the disks is not sufficient to cause the oil to fly off of them as a result of centrifugal motion. The wires that are located at points of the greatest diameter of the disk will scrape off a greater quantity of oil and direct it into the tubes in a given time than wires or brushes that may be located nearer the center thereof, and the position of the wires in contact with the face of the disk will determine the relative quantity of the feed. Therefore bearings that require a greater quantity of lubrication in a given time than others may be located upon the disk with this object in view, or a wire or brush that has surface contact with the disk may be bent so as to have contact nearer or farther from the center, as may be required to feed a greater or less quantity of oil in a given time, the speed of the disk remaining constant, or two wires may be included in a given tube to increase the quantity, or the end of the wire having contact with the disk may be flattened out, so as to increase the surface of contact with the disk for the purpose of increasing the feed of the lubricant in any given tube.

It is obvious that when the disks $c^6$ and $c^7$ are slowly turned, their lower surfaces being submerged in a bath of oil, a quantity of oil will adhere to the disk, which will be scraped off by the wires and conveyed into the tubes.

One very important advantage of my present invention is that it is entirely automatic. When the engine starts, the device begins to feed the lubricant. It will feed proportionately to the speed of the engine. The faster the disks $c^6$ $c^7$ are revolved, within a very great range, a correspondingly greater quantity of oil will be scraped from the surface of the disks by the wires and fed to the moving surfaces of the engine. When the engine is stopped, the feeding device also stops. It is not necessary to tax the memory, except to see that the reservoir is properly supplied. This device is especially valuable when used with engines on motor-vehicles.

Having described my invention, what I claim as new, and desire to secure by Letters Patent of the United States, is—

1. In a lubricator device the combination of an oil-reservoir, a disk adapted to be revolved in said reservoir, a tube extending from said reservoir, and a scraper having one end bearing against the side face of said disk, and the other end within the said tube, substantially as set forth.

2. A lubricating device comprising an oil-reservoir, a series of tubes extending from said reservoir to bearings to be lubricated, a disk adapted to be revolved within said reservoir, a series of scrapers bearing upon the sides of said disk for transferring the oil from the said disk to said tubes, the radial point of contact of each scraper corresponding with the quantity of oil required in a given time for the respective bearings, substantially as set forth.

In testimony whereof I have signed this specification, in the presence of two subscribing witnesses, this 24th day of May, A. D. 1900.

WILLIAM O. WORTH.

Witnesses:
 FORÉE BAIN,
 M. F. ALLEN.